(12) United States Patent
Kondoh

(10) Patent No.: US 8,687,035 B2
(45) Date of Patent: Apr. 1, 2014

(54) OPTICAL SCANNING DEVICE AND IMAGE FORMING APPARATUS PROVIDED WITH THE SAME

(71) Applicant: Kyocera Document Solutions Inc., Osaka (JP)

(72) Inventor: Kazuhisa Kondoh, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/655,334

(22) Filed: Oct. 18, 2012

(65) Prior Publication Data

US 2013/0093827 A1    Apr. 18, 2013

(30) Foreign Application Priority Data

Oct. 18, 2011 (JP) .................................. 2011-228530

(51) Int. Cl.
*B41J 2/385* (2006.01)
*B41J 2/41* (2006.01)
*B41J 2/435* (2006.01)

(52) U.S. Cl.
USPC ............ 347/245; 347/138; 347/152; 347/263

(58) Field of Classification Search
None
See application file for complete search history.

(56) References Cited

U.S. PATENT DOCUMENTS

| | | | |
|---|---|---|---|
| 6,753,985 B1 * | 6/2004 | Kaneko et al. | ................. 358/484 |
| 2007/0263065 A1 | 11/2007 | Kawasaki | |
| 2008/0277095 A1 * | 11/2008 | Zhai | .............................. 165/80.4 |

FOREIGN PATENT DOCUMENTS

| | | |
|---|---|---|
| JP | 2005-148598 | 6/2005 |
| JP | 2009-175455 A | 8/2009 |

OTHER PUBLICATIONS

Notice of Reasons for Rejection issued in Japanese Application No. 2011-228530, mailed Jul. 30, 2013.

* cited by examiner

*Primary Examiner* — Matthew Luu
*Assistant Examiner* — Kendrick Liu
(74) *Attorney, Agent, or Firm* — Arent Fox LLP

(57) ABSTRACT

An optical scanning device includes an air-tight casing, an air-tight container and a tube-like member. The air-tight casing is configured to accommodate at least a polygon mirror and a driving unit that rotates the polygon mirror. The air-tight container is disposed at a distance from the air-tight casing and outside an outer wall surface vertically above the air-tight casing. The tube-like member is configured to communicatively connect an inside of the air-tight casing and an inside of the air-tight container.

7 Claims, 9 Drawing Sheets

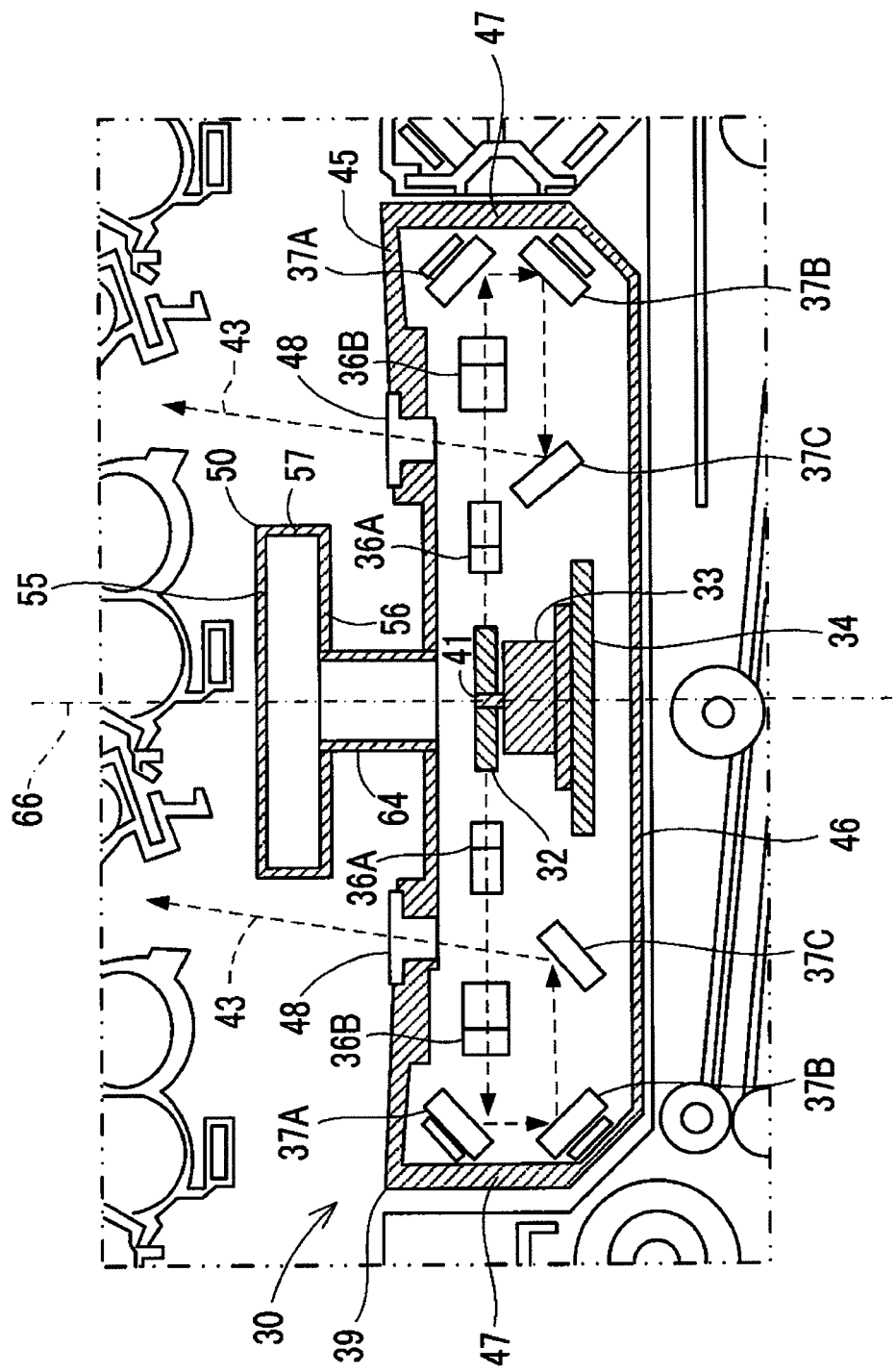

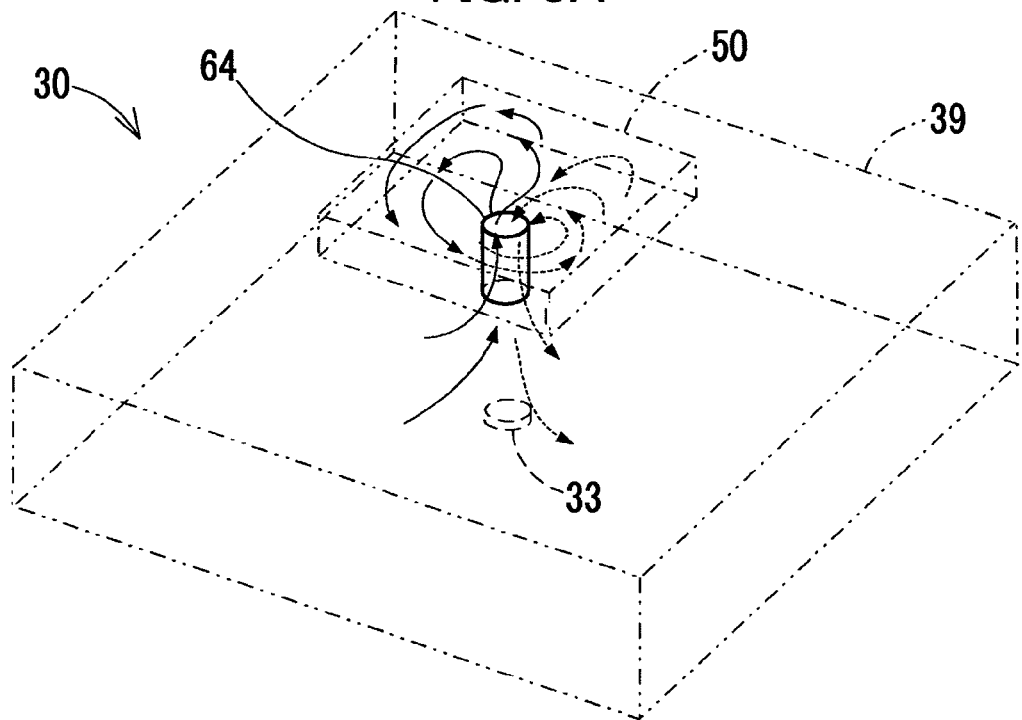
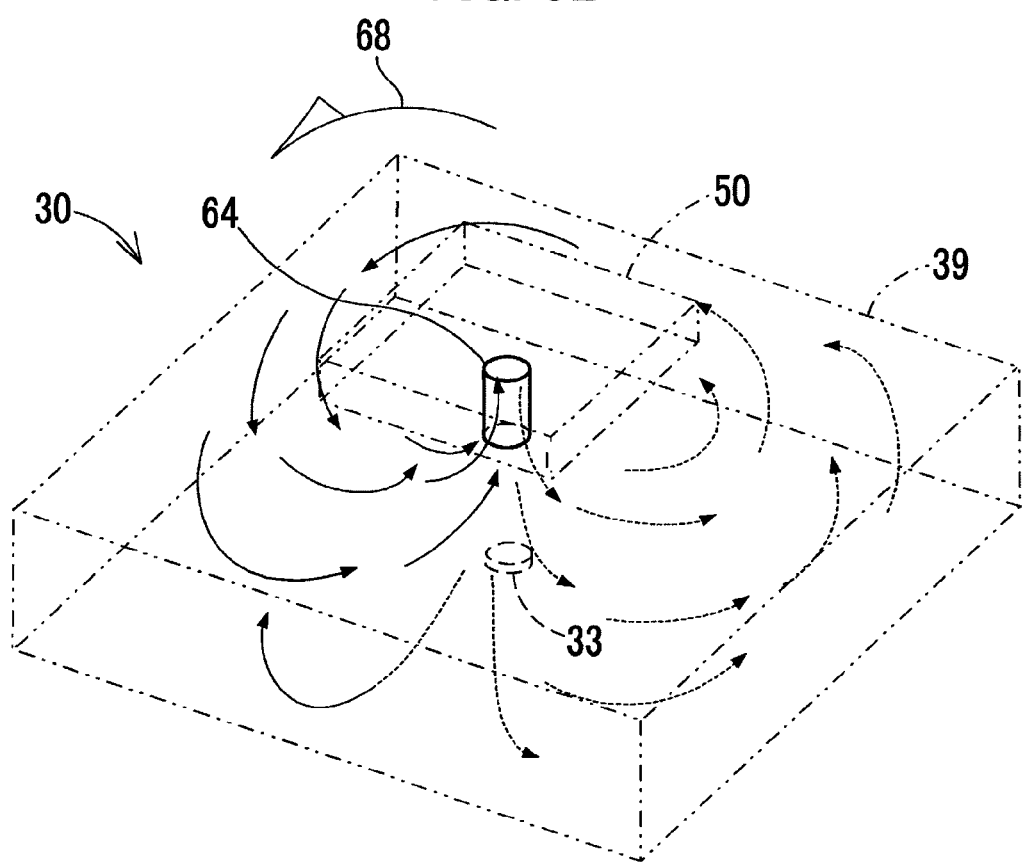

OPTICAL SCANNING DEVICE AND IMAGE FORMING APPARATUS PROVIDED WITH THE SAME

INCORPORATION BY REFERENCE

This application is based on and claims the benefit of priority from Japanese Patent Application No. 2011-228530, filed on 18 Oct. 2011, the content of which is incorporated herein by reference.

BACKGROUND

The present disclosure relates to an optical scanning device that radiates heat inside the device and an image forming apparatus provided with the same.

An electrophotographic image forming apparatus is provided with an optical scanning device that exposes a photoreceptor by irradiating the photoreceptor with light. The optical scanning device includes a light source such as laser light, a polygon mirror that reflects light from the light source, a motor that rotates the polygon mirror, an fθ lens that forms an image of the light from the polygon mirror on a photoreceptor, and a reflective mirror that reflects the light having passed through the fθ lens toward the photoreceptor. In such an optical scanning device, each component is housed in a highly air-tight casing in order to keep out dust.

When the casing is highly air-tight, heat from a component housed inside, especially the motor or a driver of the motor, is not easily radiated and the temperature inside the casing rises. When the temperature inside the casing is high, the polygon mirror and the reflective mirror are distorted. Accordingly, a phenomenon of scanning line curvature occurs, in which the light scanned by the polygon mirror is curved. To solve drawbacks described above, various technical measures have been conventionally made to the casing so that the heat inside the optical scanning device is efficiently radiated. For example, an exposure device in which a polygon mirror and a motor are housed by an inner casing that is further covered by an outer casing is reported. In addition, an optical writing device is reported, which includes a casing with an opening, cooling fan provided inside and lid that uncovers the opening by a force applied by an air flow generated by the cooling fan in operation and covers the opening by its own weight while the cooling fan is not in operation.

However, since the inner casing is shielded from outside by the outer casing in the exposure device described above, an inner space of the outer casing provides a heat insulating effect to the inner casing. Accordingly, it may not be possible to directly radiate heat from the inner casing. In addition, since the opening is provided to the casing in the optical writing device described above, dust cannot be completely prevented from entering the device through the opening. More specifically, as the cooling fan stops and the air flow ceases, the lid rotationally moves to a direction to cover the opening. At this moment, rotational movement of the lid member generates an inward air flow that may bring fine dust into the device through the opening. Furthermore, since the optical writing device requires two driving units, one motor for the polygon mirror and another for the cooling fan, additional steps for assembling the cooling fan and wiring are required, thereby increasing manufacturing costs. Moreover, since it is necessary that the casing is configured to enable two driving units to be fixed and vibrations caused by the driving units to be suppressed, the configuration of the device will be complex.

The present disclosure has been made in view of the above-mentioned situation. It provides an optical scanning device and an image forming apparatus provided therewith. The optical scanning device enables efficient cooling of a driving unit of a polygon mirror by circulating inside air by a simple configuration without a driving unit such as a cooling fan.

SUMMARY

According to an aspect of the present disclosure, an optical scanning device includes an air-tight casing, an air-tight container and a tube-like member. The air-tight casing is configured to accommodate at least a polygon mirror and a driving unit that rotates the polygon mirror. The air-tight container is disposed at a distance from the air-tight casing and outside an outer wall surface vertically above the air-tight casing. The tube-like member is configured to communicatively connect an inside of the air-tight casing and an inside of the air-tight container.

BRIEF DESCRIPTION OF DRAWINGS

FIG. 2 is a partially enlarged view of a main part II of FIG. 1, illustrating a configuration of the optical scanning device 30 according to the embodiment of the present disclosure;

FIGS. 5A and 5B are simplified schematic views illustrating natural convection inside the casing 39 and the box 50, FIG. 5A being a diagram showing an air flow inside the box 50 and FIG. 5B being a diagram showing an air flow inside the casing 39;

DETAILED DESCRIPTION

An embodiment of the present disclosure is described hereinafter with reference to the drawings. The embodiment described herein is a mere example of implementation of the present disclosure, and may be modified accordingly without departing from the scope of the present disclosure.

First, a schematic configuration of a printer 10 (an example of an image forming apparatus of the present disclosure) according to an embodiment of the present disclosure is described with reference to FIG. 1. Configurations not described herein are the same as those of a standard image forming apparatus using electrophotography, and therefore description thereof is omitted. The printer 10 is a mere example of the image forming apparatus of the present disclosure and the image forming apparatus of the present disclosure includes, for example, a facsimile apparatus and a multifunction peripheral. In addition, the printer 10 is described herein as a printer configured for full-color printing. However, the present disclosure is applicable to a printer configured for black-and-white printing.

Figure 1:
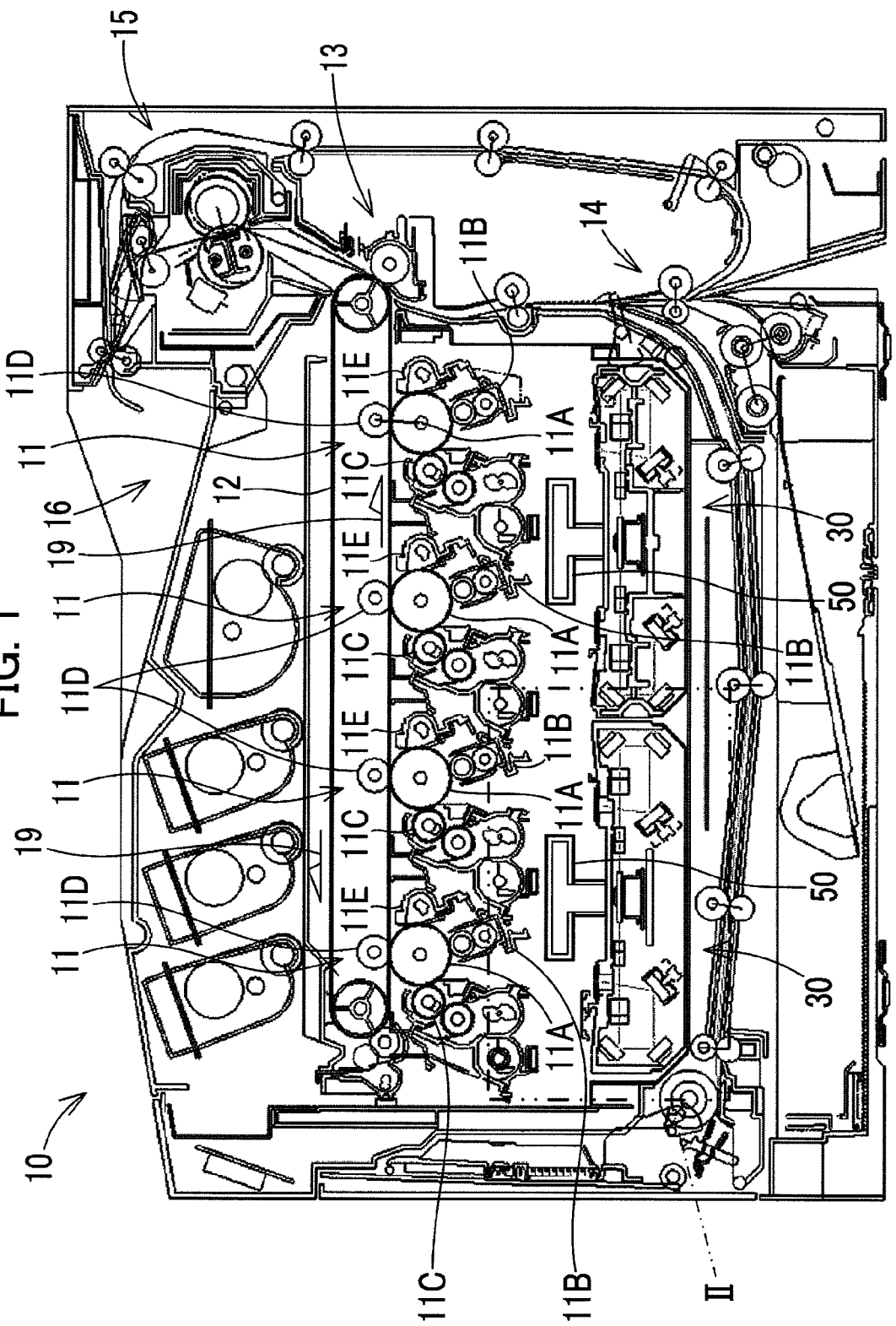
FIG. 1 is a schematic cross-sectional view illustrating a configuration of a printer 10 provided with an optical scanning device 30 according to an embodiment of the present disclosure.

As shown in FIG. 1, the printer 10 includes four image forming units 11, two optical scanning devices 30 (an example of the optical scanning device of the present disclosure), an intermediate transfer belt 12, a secondary transfer device 13, a paper feeding device 14, a fusing device 15, and a paper discharge unit 16. The printer 10 also includes a control unit (not illustrated) having a CPU, ROM, RAM and the like, an operation display unit (not illustrated) on which various types of input of operation are performed and various types of information are displayed. Each of the two optical scanning devices 30 corresponds to each two of the four image forming units 11, and is arranged below the two image forming units 11.

In the present embodiment, the two optical scanning devices 30 corresponding to the four image forming units 11 are provided in the printer 10, for example. However, the present disclosure is also applicable to a printer 10 in which four optical scanning devices 30 are provided corresponding respectively to the four image forming units 11. Furthermore, the present disclosure is applicable to a printer 10 in which a single optical scanning device 30 is provided corresponding to three or four image forming units 11.

The four image forming units 11 are of general electrophotography and correspond to four colors black, yellow, cyan and magenta, sequentially from right in FIG. 1. Each image forming unit 11 includes a photoreceptor drum 11A, charging device 11B, developing device 11C, primary transfer roller 11D, and cleaning device 11E.

The printer 10 forms an image on a sheet of printing paper fed from the paper feeding device 14 according to the following steps. First, the charging device 11B electrically charges the photoreceptor drum 11A at a predetermined potential. Next, the optical scanning device 30 irradiates a surface of the photoreceptor drum 11A with laser light based on image data, thereby forming an electrostatic latent image. And then, the developing device 11C develops the electrostatic latent image on the photoreceptor drum 11A as a toner image (visible image). Thereafter, the primary transfer roller 11D transfers the toner image on the photoreceptor drum 11A to the intermediate transfer belt 12 running in a direction shown by an arrow 19 in FIG. 1. In this connection, the photoreceptor drum 11A is cleaned by the cleaning device 11E after the toner image is transferred to the intermediate transfer belt 12.

In this manner, the image forming units 11 transfer toner images sequentially onto the intermediate transfer belt 12 to overlap one another, so that a full-color image is formed on the intermediate transfer belt 12. Subsequently, the full-color image formed on the intermediate transfer belt 12 is transferred to the sheet of printing paper by the secondary transfer device 13. After that the fusing device 15 fuses and fixes the toner image on the sheet of printing paper. This sheet of printing paper is discharged to the paper discharge unit 16.

The optical scanning device 30 is described hereinafter with reference to FIGS. 2 to 6A-6C. In FIGS. 3A-3B to 6A-6C, the optical scanning device 30 with a simplified configuration is shown for the sake of easy understanding. The optical scanning device 30 emits laser light toward the photoreceptor drum 11A. As shown in FIG. 2, the optical scanning device 30 includes a laser light source (not illustrated), a polygon mirror 32 (an example of the polygon mirror of the present disclosure), a motor 33 (an example of the driving unit of the present disclosure), a driver circuit board 34 (an example of the driving unit of the present disclosure), fθ lenses 36A and 36B, deflecting mirrors 37A, 37B and 37C, and a casing 39 (an example of the casing of the present disclosure) that houses these components. In the optical scanning device 30, two sets of the laser light source, two sets of the fθ lenses 36A and 36B, and two sets of the deflecting mirrors 37A, 37B and 37C are provided for one polygon mirror 32.

The polygon mirror 32 made of an aluminum alloy is a rotary multifaceted mirror with six reflective surfaces that reflect the laser light emitted from the laser light source. The polygon mirror 32 has a regular hexagonal shape in a plan view. A motor 33 is provided below the polygon mirror 32. In other words, the polygon mirror 32 is located vertically above the motor 33. The motor 33 has an output shaft 41 to which the polygon mirror 32 is connected, the output shaft 41 extending vertically upward (in a vertical direction in FIG. 2). As a result, as the motor 33 rotates in response to a signal received from the driver circuit board 34, the polygon mirror 32 rotates about the output shaft 41.

The motor 33 drives the polygon mirror 32 to rotate. The laser light emitted from the laser light source to the polygon mirror 32 is reflected by the polygon mirror 32. The reflected light passes through an optical path 43 (see an arrow of broken line in FIG. 2) and scans on a surface of the photoreceptor drum 11A in a predetermined direction. More specifically, the laser light emitted in a horizontal direction by the laser light source is reflected by the reflective surfaces at which a reflection angle is changed by a rotation of the polygon mirror 32, and scanning is performed in the horizontal direction. The laser light reaches the deflecting mirror 37A via the fθ lens 36A and the fθ lens 36B. The laser light is then deflected by the deflecting mirror 37A, the deflecting mirror 37B and the deflecting mirror 37C toward the photoreceptor drum 11A, and forms an image on the surface of the photoreceptor drum 11A.

Figure 3A:
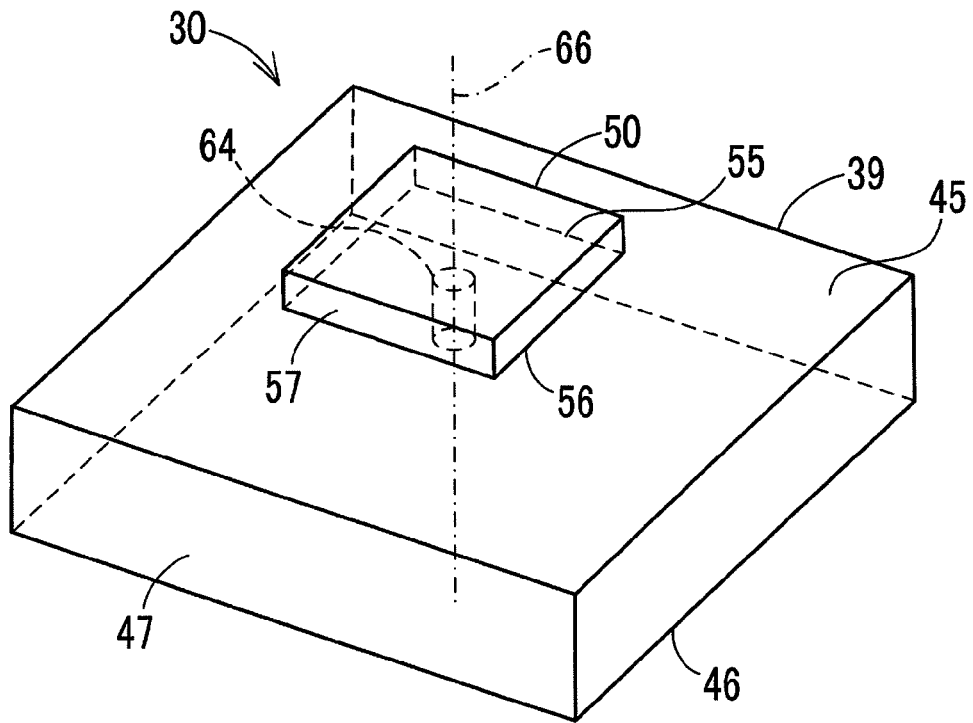
FIGS. 3A and 3B are schematic perspective views illustrating a simplified configuration of a casing 39 and a box 50, FIG. 3A being an external configuration diagram and FIG. 3B being an internal arrangement diagram.
Figure 3B:
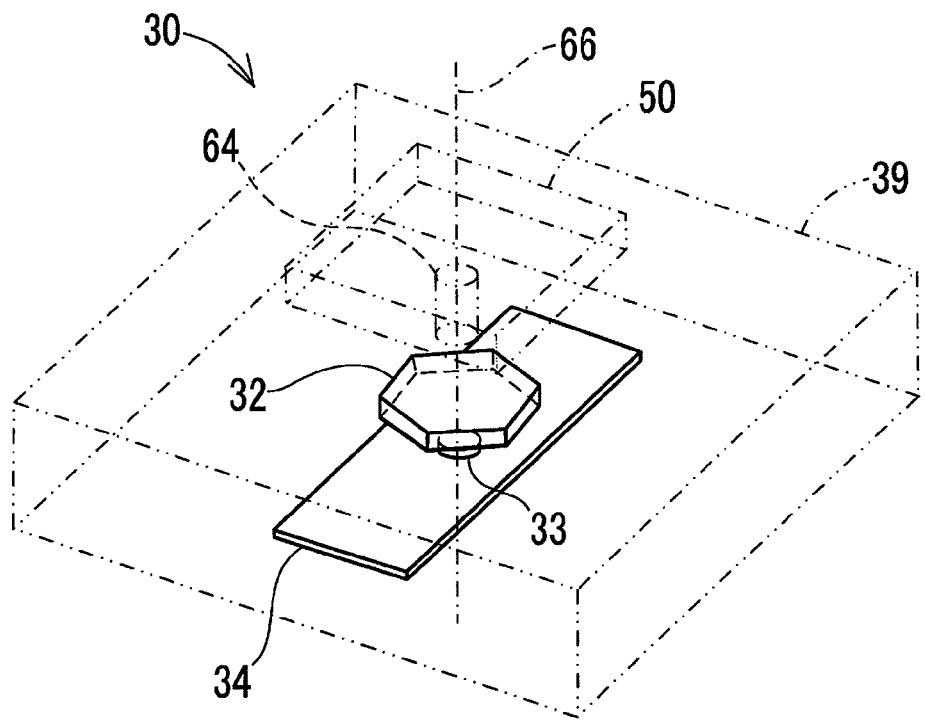
Figure 4A:
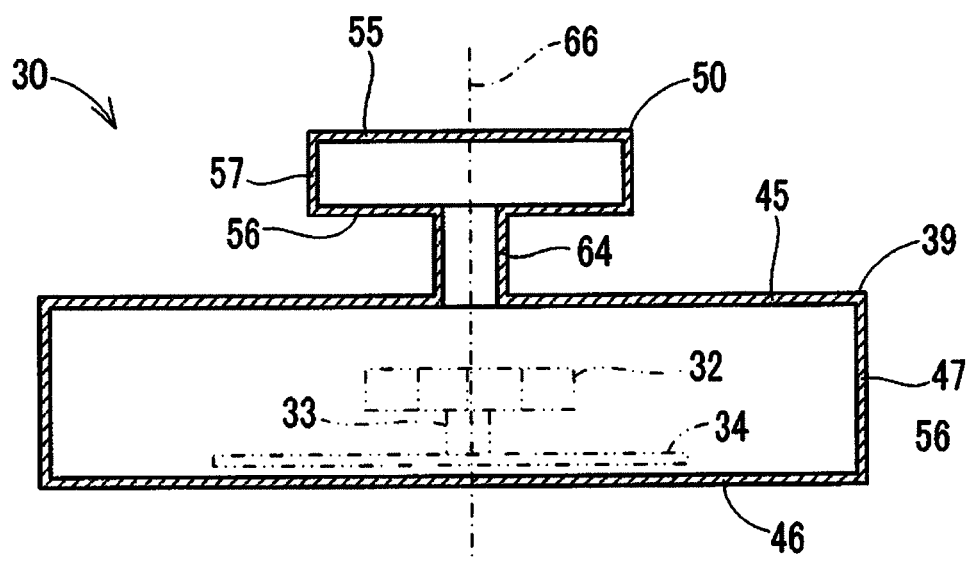
FIGS. 4A and 4B are simplified schematic cross-sectional views illustrating central cross sections of the casing 39 and the box 50, respectively, FIG. 4A being a cross-sectional view showing a connection structure by a communication tube 64 and FIG. 4B being an internal arrangement diagram.
Figure 4B:
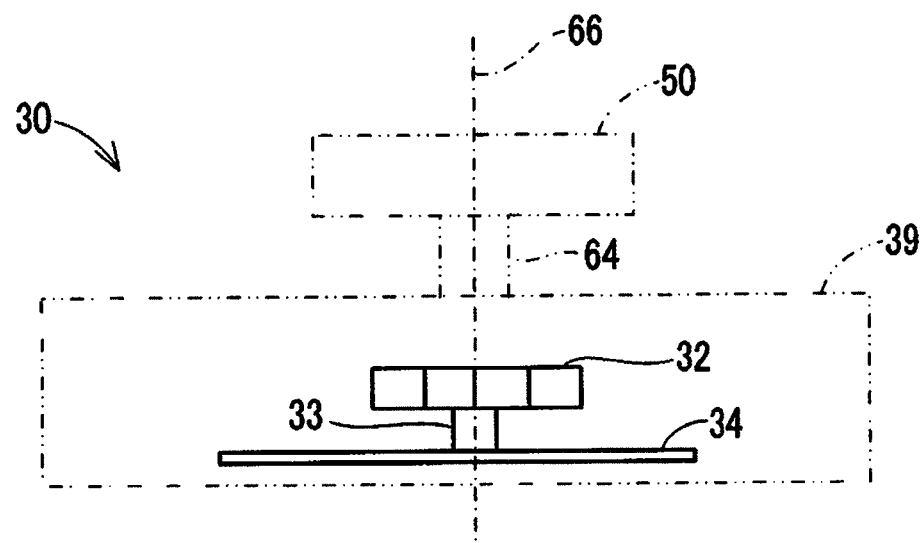

The casing 39 houses the polygon mirror 32, the motor 33, the driver circuit board 34 and the like. The casing 39 is formed of thermally conductive plastic, for example. As described above, the laser light passes along the optical path 43 in an inner space of the casing 39 in the optical scanning device 30. Accordingly, if dust enters the casing 39, the laser light is diffusely reflected by the dust and the electrostatic latent image on the photoreceptor drum 11A is deteriorated. Therefore, the casing 39 is configured to be air-tight in order to prevent air from moving between inside and outside thereof. More specifically, as shown in FIGS. 3A and 3B, the casing 39 is composed of an upper wall 45, a bottom wall 46, and side walls 47 surrounding four sides. An inner space of the casing 39 is maintained air-tight. In order to allow the laser light to advance from the deflecting mirror 37C to the photoreceptor drum 11A, a transparent panel 48 (see FIG. 2) is mounted where the upper wall 45 and the optical path 43 intersect each other.

As shown in FIGS. 3A, 3B, 4A and 4B, a cylindrical-shaped communication tube 64 (an example of the tube-like member of the present disclosure) is provided at the upper wall 45 of the casing 39. The communication tube 64 is formed of the same material as the casing 39, in other words, plastic of the same thermal conductivity. The communication tube 64 is a plastic tube with openings at upper and lower ends, of which cross-sectional area is sufficiently smaller than the plane area of the casing 39. The communication tube 64 is provided upright at the center of the upper wall 45, and the lower end thereof is connected to the casing 39 so as to penetrate the upper wall 45 (see FIG. 4A). As a result, the inside of the communication tube 64 communicates with the inside of the casing 39, allowing the movement of air between them. A portion connecting the communication tube 64 and the upper wall 45 is configured to be air-tight in order to prevent an intrusion of dust. In the present embodiment, the communication tube 64 is aligned with an extended line of a rotational shaft 66 of the polygon mirror 32 outside the upper wall 45.

A box 50 (an example of the air-tight container of the present disclosure) is provided vertically above the casing 39. The box 50 is provided such that the heat generated by the motor 33 and the driver circuit board 34 inside the casing 39 is efficiently radiated during operation of the optical scanning device 30. The box 50 is provided outside an outer wall facing the polygon mirror 32. More specifically, the box 50 is spaced from the casing 39 outside the upper wall 45 vertically above the casing 39. The box 50 has a shape of a rectangular parallelepiped vertically flattened and is formed of the same material as the casing 39, in other words plastic of the same thermal conductivity. The box 50 is composed of an upper wall 55, a bottom wall 56, and side walls 57 surrounding four sides. An empty space is formed inside the box 50. Similarly to the casing 39, the box 50 is configured such that the inner space is air-tight.

The upper end of the communication tube 64 is connected to the center of the bottom wall 56 of the box 50. More specifically, the communication tube 64 is connected to the box 50 such that the upper end of the communication tube 64 penetrates the bottom wall 56 (see FIG. 4A). As a result, the inside of the communication tube 64 communicates with the inside of the box 50, allowing the movement of air between them. In other words, the communication tube 64 connects the casing 39 and the box 50, such that the inside of the casing 39 communicates with the inside of the box 50.

In the present embodiment, the heat transfer coefficient of the outer wall of the box 50 is set to be greater than that of the outer wall of the casing 39. More specifically, a thickness and a shape are determined for each of the upper wall 55, the bottom wall 56 and the side walls 57 of the box 50, such that heat transfer coefficients are 15 $W/m^2K$, 3.5 $W/m^2K$, and 7.5 $W/m^2K$, respectively. On the other hand, a thickness and a shape are determined for each of the walls of the casing 39, such that heat transfer coefficient are smaller than 3.5 $W/m^2K$. It may be an example that the outer walls of the box 50 have fins or are formed to be thinner than the outer walls of the casing 39. Alternatively, it may be that the outer walls of the box 50 are formed of a material having higher thermal conductivity than that of the outer walls of the casing 39.

When the optical scanning device 30 thus configured is in operation, the motor 33 and the driver circuit board 34 generate heat, causing the air around them to be warmed. On the other hand, since the box 50 does not contain a heat source such as the motor 33, the temperature of air inside the box 50 is lower than that of the casing 39, especially the air around the motor 33 and the driver circuit board 34. This causes natural convection between the air inside the box 50 and the air inside the casing 39. More specifically, as shown in FIG. 5B, as the motor 33 rotates the polygon mirror 32 in a direction of an arrow 68, the heated air (warm air) around the motor 33 gradually moves upward by natural convection, while it moves around the rotational shaft 66 due to a vortex stream of air caused by rotation of the polygon mirror 32. When the warm air moved upward reaches the lower end of the communication tube 64, it moves into the box 50 via the communication tube 64 (see FIG. 5A). The warm air performs heat exchange with the air outside the box 50 via the outer walls as heat exchange media, while the warm air is circulating inside the box 50.

On the other hand, the relatively cool air in the box 50 moves into the casing 39 via the communication tube 64, replacing the warm air moved from the casing 39 into the box 50 (see FIG. 5A). The cool air having moved from the box 50 to the casing 39 gradually moves downward by natural convection while it moves in the direction of the arrow 68 due to the vortex stream of air caused by rotation of the polygon mirror 32. When the cool air reaches a vicinity of the motor 33 and the driver circuit board 34, the cool air performs heat exchange with the motor 33 and the driver circuit board 34 and is warmed. The air thus heated moves up again by natural convection toward the box 50. As described above, the natural convection of air occurs between the box 50 and the casing 39, causing a circulation of air between the box 50 and the casing 39. Accordingly, it is possible to efficiently radiate the heat generated by the motor 33 and the driver circuit board 34 outside the optical scanning device 30.

Figure 6A:
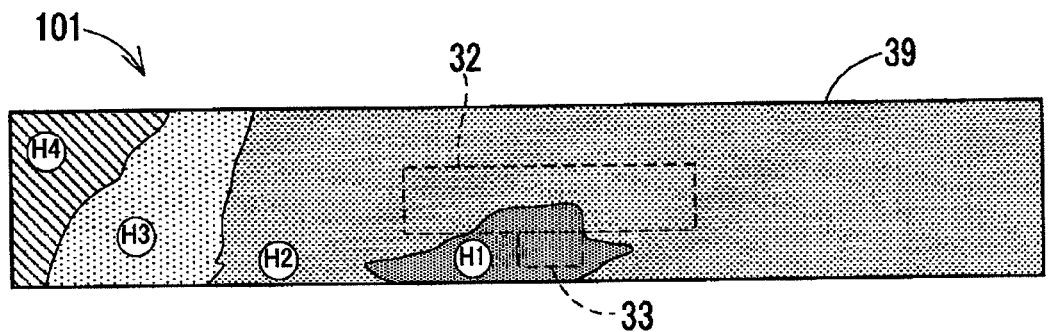
FIGS. 6A to 6C are heat distribution diagrams showing results of verification of heat radiation effect of a conventional optical scanning device 101 (6A), a conventional optical scanning device 102 (6B) and the optical scanning device 30 of the present disclosure (6C)
Figure 6B:
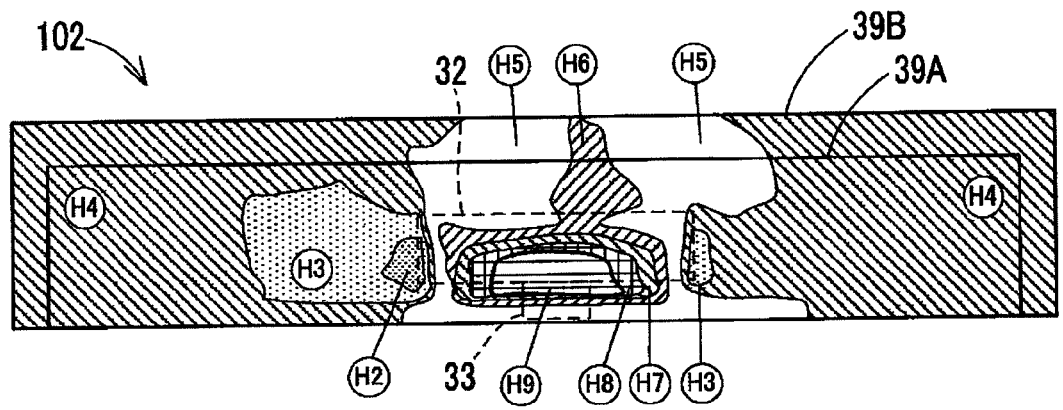
Figure 6C:
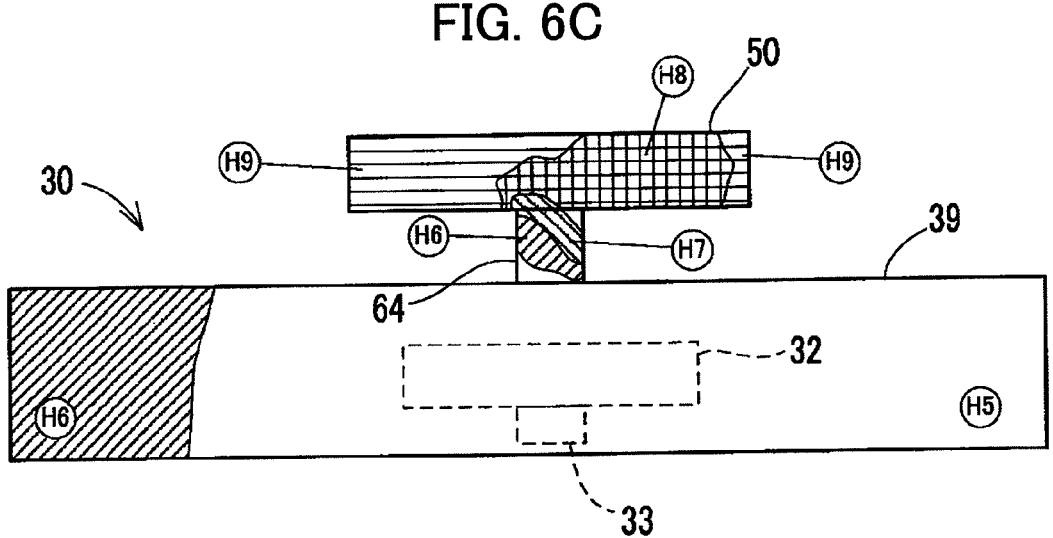

Results of heat radiation verification of the present disclosure are described hereinafter with reference to FIGS. 6A to 6C. FIG. 6A is a heat distribution diagram of a conventional optical scanning device 101 having only an air-tight casing 39. FIG. 6B is a heat distribution diagram of a conventional optical scanning device 102 having an air-tight inner casing 39A and an outer casing 39B covering the inner casing 39A. FIG. 6C is a heat distribution diagram of the optical scanning device 30 having the casing 39, the communication tube 64, and the box 50. In the diagrams, a symbol H1 indicates a region of highest temperature and a symbol of H9 indicates a region of lowest temperature. It should be noted that these heat distribution diagrams each show a result of computer simulation of heat radiation effects under the same conditions, such as operation time and rotation speed of the motor 33, simulation time and the like.

According to FIG. 6A, the temperature inside the casing 39 is relatively high in the conventional optical scanning device 101. According to FIG. 6B, the conventional optical scanning device 102 provides a better heat radiation effect than the optical scanning device 101, however, there still remains a region of high temperature due to a heat insulation effect of the outer casing 39B. According to FIG. 6C, the box 50 provides a remarkable heat radiation effect of air. In addition, although there is no region of lowest temperature in the casing 39, the temperature inside the casing 39 is maintained to be uniform. The heat distribution diagram demonstrates that the air is smoothly circulated by natural convection in the optical scanning device 39. In addition, since the temperature inside the casing 39 is maintained to be uniform, a local point of extreme temperature does not occur at the fθ lenses 36A and 36B as well as the deflecting mirrors 37A, 37B, and 37C housed inside the casing 39. As a result, it is possible to decrease distortion of these components due to non-uniform temperatures.

As described above, when the vortex stream of air about the rotational shaft 66 of the polygon mirror 32 occurs, a pressure at a center is lower than a periphery of the vortex stream of air in the present embodiment. Accordingly, it is easier for the air to move upward. The communication tube 64 is aligned with the extended line of the rotational shaft 66. Consequently, the air having moved upward in the vicinity of the rotational shaft 66 of the polygon mirror 32 is efficiently guided to the communication tube 64 and moves to the box 50 provided outside the upper wall 45 of the casing 39. The air smoothly circulates by natural convection between the box 50 and the casing 39. Accordingly, it is possible to efficiently radiate the heat from the motor 33 and the like outside the optical scanning device 30.

In addition, since the heat transfer coefficient of the outer walls of the box 50 is greater than that of the outer walls of the casing 39, cooling of the air inside the box 50 is facilitated. In this manner, it is possible to generate more intense natural convection between the box 50 and the casing 39.

Although the communication tube 64 is aligned with the extended line of the rotational shaft 66 of the polygon mirror 32 in the above embodiment, it may alternatively be possible to locate the communication tube 64 offset with respect to the extended line of the rotational shaft 66. Since the circulation of air by natural convection smoothly proceeds in the offset configuration, it may be possible to efficiently radiate the heat from the motor 33 and the like outside the optical scanning device 30.

Figure 7A:
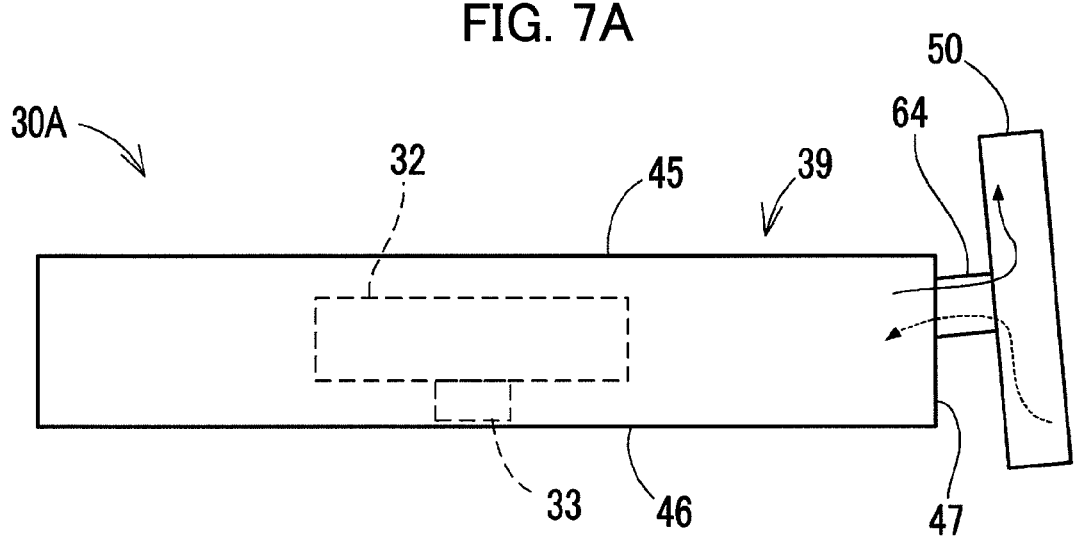
FIGS. 7A and 7B are schematic perspective views each illustrating an optical scanning device 30A according to another embodiment of the present disclosure.
Figure 7B:
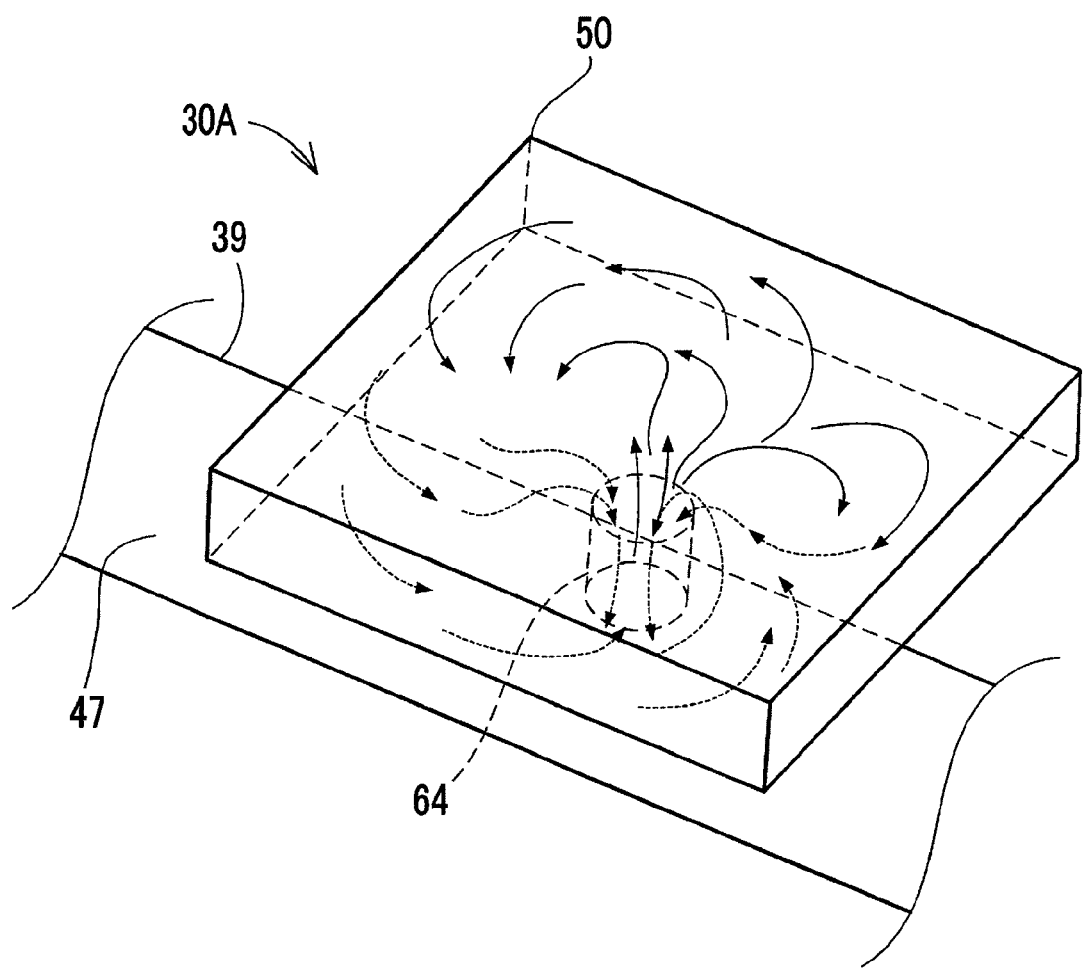
Figure 8:
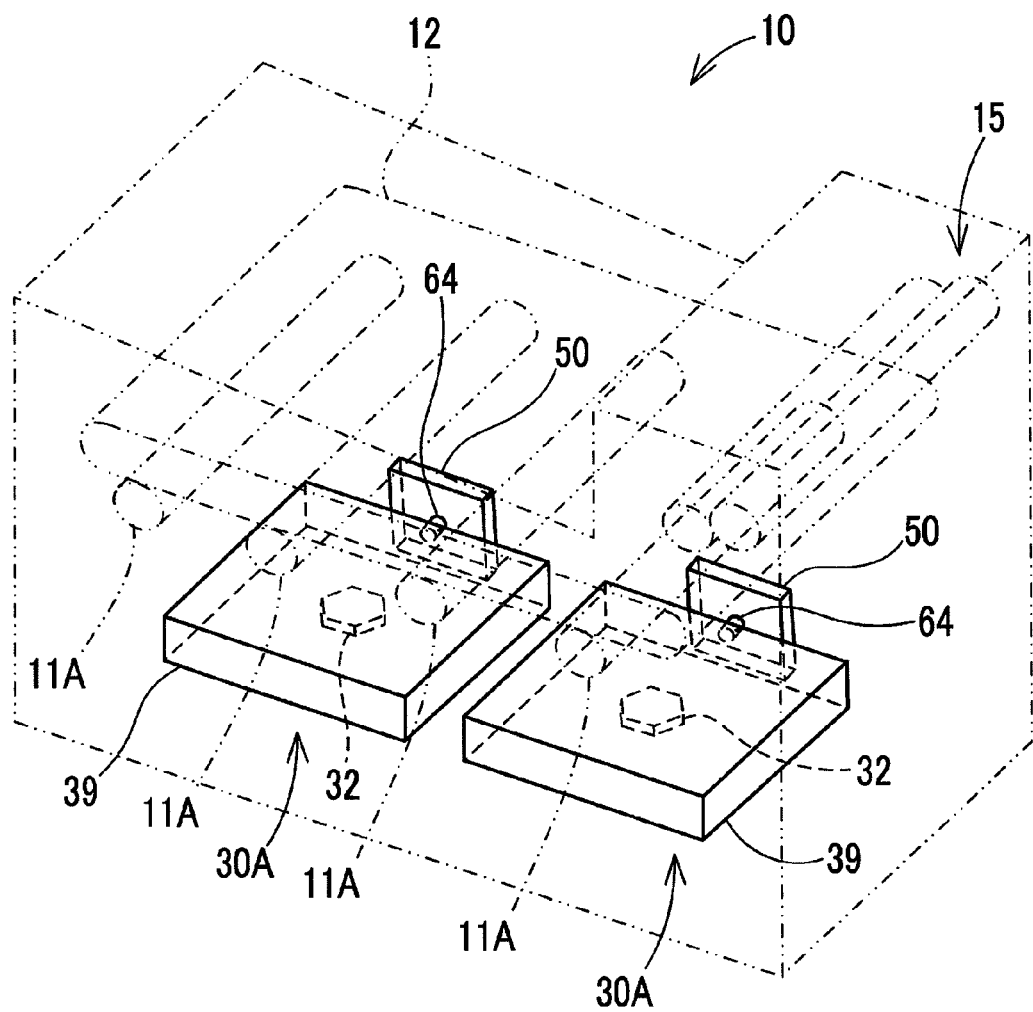
FIG. 8 is a schematic perspective view illustrating the printer 10 provided with the optical scanning device 30A.

Although the communication tube 64 is connected to the upper wall 45 of the casing 39 and the box 50 is provided above the upper wall 45 in the above embodiment, it may be possible to adopt an alternative embodiment of the present disclosure as shown in FIG. 7A. In the alternative embodiment, an optical scanning device 30A is configured such that the communication tube 64 is disposed at the side wall 47 of the casing 39 and the box 50 is connected to an end of the communication tube 64. In the optical scanning device 30A, the communication tube 64 is connected to an upper portion of the side wall 47, which lies closer to the upper wall 45. In this manner, a part of the box 50 is positioned vertically above the upper wall 45. As shown in FIGS. 7A and 7B, natural convection is generated between the box 50 and the casing 39 due to an air temperature difference. As a result, a heat exchange with the ambient air occurs also in the box 50 due to air convection. Accordingly, the heat from the motor 33 and the like is efficiently radiated outside the optical scanning device 30A, by an air circulation caused by natural convection. As shown in FIG. 8, it is possible to reduce a distance between the casing 39 and the photoreceptor drum 11A and the like as a result of arranging the box 50 on a side of the side wall 47, in a case in which the optical scanning device 30A is installed in the printer 10. Accordingly, it is possible to decrease a size in height of the printer 10.

Figure 9A:
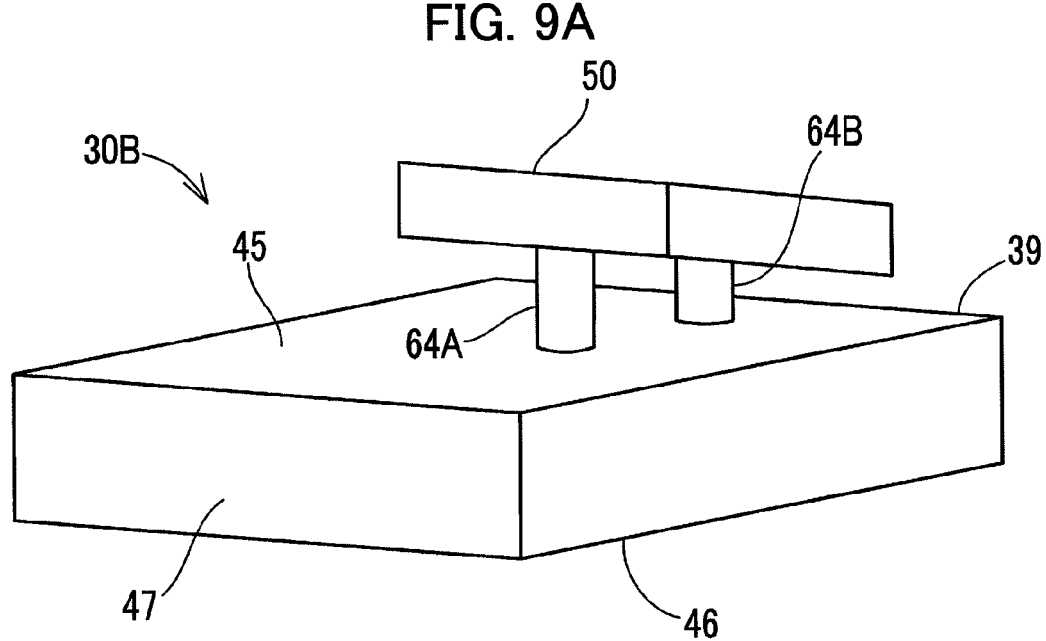
FIGS. 9A and 9B are partially enlarged views illustrating modifications of a configuration of the communication tube 64.
Figure 9B:
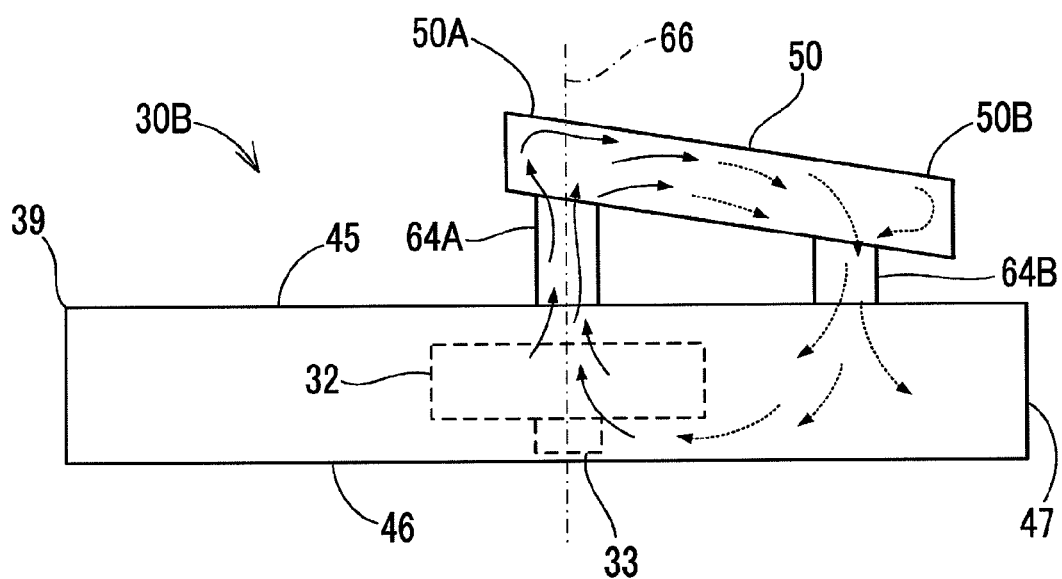

As shown in FIGS. 9A and 9B, it may be possible to adopt an optical scanning device 30B as an alternative embodiment of the present disclosure, in which the casing 39 and the box 50 are connected to each other by a first communication tube 64A and a second communication tube 64B (an example of the tube-like member of the present disclosure). In the optical scanning device 30B, the first communication tube 64A is formed to be longer than the second communication tube 64B. In addition, the first communication tube 64A is aligned with the extended line of the rotational shaft 66 of the polygon mirror 32. On the other hand, the second communication tube 64B is located at an end portion of the upper wall 45, which lies closer to the side wall 47.

In such a configuration, the air heated in the casing 39 moves to the box 50 via the first communication tube 64A. This air is cooled in the box 50 while it performs a heat exchange with the ambient air. In this manner, the cooled air moves to the casing 39 via the second communication tube 64B. Since a circulation in one direction due to natural convection occurs, it is possible to cause the air to be smoothly circulated between the box 50 and the casing 39. Accordingly, the heat from the motor 33 and the like is efficiently radiated outside the optical scanning device 30.

In addition, since the first communication tube 64A is formed to be longer than the second communication tube 64B, an end portion 50A of the box 50 lying closer to the rotational shaft 66 is positioned higher than an end portion 50B lying closer to the side wall 47. As a result, the box 50 is inclined with respect to the upper wall 45 of the casing 39. The air having moved to the box 50 via the first communication tube 64A moves obliquely downward along the inclination of the box 50 while the air is cooled. Subsequently, the air is guided to the second communication tube 64B and moves back to the casing 39. Accordingly, the movement of air due to natural convection more smoothly occurs, so that an air circulation between the box 50 and the casing 39 is efficiently performed.

The present disclosure can be applied to an optical scanning device that exposes a photoreceptor by emitting light, and an image forming apparatus provided therewith.

The invention claimed is:

1. An optical scanning device comprising:
   an air-tight casing configured to accommodate at least a polygon mirror and a driving unit that rotates the polygon mirror;
   an air-tight container disposed at a distance from the air-tight casing and outside an outer wall surface vertically above the air-tight casing; and
   a tube-like member configured to communicatively connect an inside of the air-tight casing and an inside of the air-tight container, wherein
   the polygon mirror is provided vertically above the driving unit,
   the tube-like member is aligned with an extended line of a rotational shaft of the polygon mirror, and
   the air-tight container is provided outside the outer wall surface facing the polygon mirror.

2. The optical scanning device according to claim 1, wherein the tube-like member comprises at least two tube-like parts.

3. The optical scanning device according to claim 1, wherein a heat transfer coefficient of an outer wall of the air-tight container is greater than a heat transfer coefficient of an outer wall of the air-tight casing.

4. An image forming apparatus comprising the optical scanning device according to claim 1.

5. An optical scanning device comprising:
   an air-tight casing configured to accommodate at least a polygon mirror and a driving unit that rotates the polygon mirror;
   an air-tight container disposed at a distance from the air-tight casing and outside an outer wall surface vertically above the air-tight casing; and
   a tube-like member configured to communicatively connect an inside of the air-tight casing and an inside of the air-tight container,
   wherein the tube-like member comprises at least two tube-like parts, and
   wherein one of the tube-like parts is configured to be longer than the other and aligned with an extended line of a rotational shaft of the polygon mirror.

6. The optical scanning device according to claim 5, wherein a heat transfer coefficient of an outer wall of the air-tight container is greater than a heat transfer coefficient of an outer wall of the air-tight casing.

7. An image forming apparatus comprising the optical scanning device according to claim 5.

* * * * *